Nov. 21, 1961
O. R. PY
3,009,252
APPARATUS FOR ACCURATELY MEASURING OR CHECKING
DIMENSIONS OR PHYSICAL MAGNITUDES
Filed April 15, 1957
4 Sheets-Sheet 1
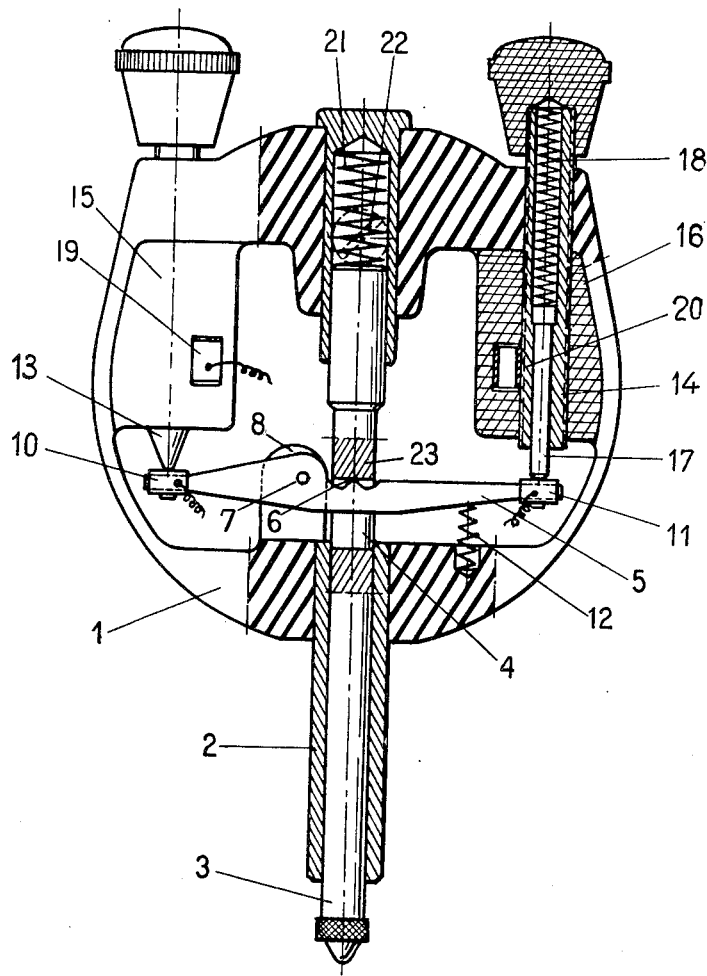
Fig. 1
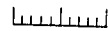
INVENTOR:
OCTAVE ROBERT PY
by
Richardson, David and Nordon
ATTY'S.

INVENTOR:
OCTAVE ROBERT PY

United States Patent Office 3,009,252
Patented Nov. 21, 1961

3,009,252
APPARATUS FOR ACCURATELY MEASURING OR CHECKING DIMENSIONS OR PHYSICAL MAGNITUDES
Octave Robert Py, 19 Rue Felix Faure, Vincennes, France
Filed Apr. 15, 1957, Ser. No. 652,863
Claims priority, application France Apr. 20, 1956
5 Claims. (Cl. 33—172)

All the various metrological means employed in mechanical workshops are adapted for effecting through frequently different methods the measurement of variations in any physical magnitude converted beforehand mainly into displacements, whether linear or else. The instruments, apparatus, tools and machines devised for measuring these displacements, although based on different principles, have the common fundamental purpose: obtain the highest possible precision at a reasonable cost and with a construction sturdy enough to withstand a prolonged use. Now this precision is subordinate on the one hand to the category in which the instruments, apparatus, tools or machines are classified and on the other hand to the inherent qualities of the devices themselves, which are dependent on their method of manufacture.

The essential requirement of devices of this general character is fidelity. Now this essential quality cannot be obtained unless:

(a) A mechanical mounting with univocal operative connections is provided, to reduce or avoid any undue plays between the interengaging parts;

(b) Flexure stresses are reduced to a minimum and permanent deformation is compensated while permitting a smooth relative movement between movable parts and providing an amplification or adequate leverage when required.

Regarding the amplification methods—when an amplification is necessary—the improvements forming the subject-matter of this invention are applicable to mechanical systems while utilizing electrical circuits for transmitting, signalling and possibly recording measures.

The grouping or combination of the various arrangements constitutes a linkage-amplification system (the term "amplification" being taken in its broadest meaning as comprising any values, including the 1:1 value) acting as a measuring head adapted to be incorporated in various instruments, apparatus or machines for measuring, checking or controlling different magnitudes, either in the form of a complete mechanism or in combination with other systems, for example electrical systems.

It is the essential object of this invention to provide an apparatus for accurately measuring or checking physical dimensions or like magnitudes, of the type comprising a feeler the movements of which control through pivoted members the movements of movable contacts adapted to close electrical signalling circuits when their movements attain a predetermined amplitude, this apparatus being characterised in that the aforesaid feeler actuates a substantially horizontal beam oscillating about an intermediate fulcrum and carrying at its ends on either side of said fulcrum the aforesaid movable electric contacts, said feeler acting on said beam at a point close to said fulcrum.

Due to this specific beam arrangement for actuating the movable contacts of the signalling circuit it is possible to amplify to a substantial degree the feeler movements, whereby the apparatus has a sensitivity much greater than that of any other known checking or measuring apparatus of the feeler type.

This invention is also concerned with a method of arranging a signalling circuit of a checking or measuring apparatus of the aforesaid type, which is characterized in that it consists in mounting directly in the case of the checking or measuring apparatus the electrical signalling circuit including, if necessary, the signalling members such as tube lamps, neon glowlamps or the like by arranging these members behind transparent ports or like sighting apertures provided in the case of the apparatus.

Finally, this invention is concerned with a signalling device adapted to be fitted on a checking or measuring apparatus of the type broadly set forth hereinabove, which is characterized in that it is designed in the form of a self-contained unit comprising a support-forming plate or like member having secured thereon the various members, connecting wires, resistors, indicating lamps or else, this self-contained unit having such dimensions that it can be fitted directly in the case of the aforesaid control or measuring apparatus.

On the other hand, a device according to this invention may be incorporated in many different types of checking and measuring apparatus.

In order to afford a clearer understanding of this invention and of the manner in which the same may be carried out in the practice, reference will now be made to the attached drawings forming part of this specification and illustrating diagrammatically by way of example a few typical embodiments of the invention.

In the drawings:

FIGURE 1 is a part-sectional elevational view showing a first embodiment of an apparatus constructed in accordance with the teachings of this invention;

Figure 2:
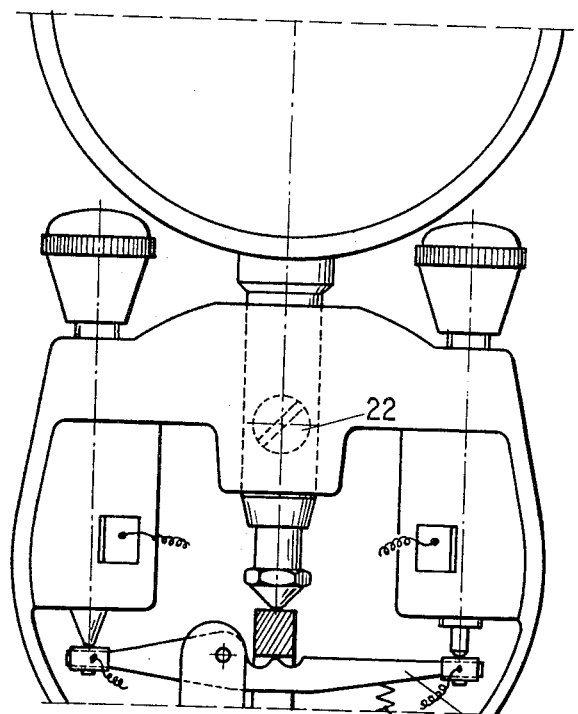
FIGURE 2 shows the optional fitting of a dial gage indicator on the apparatus of FIG. 1.

Reference will firstly be made to FIGURE 1 of the drawings on which a typical embodiment of a measuring apparatus is being shown diagrammatically for the purpose of exemplifying in the form of a unitary sctructure some of the essential features and principles of this invention.

The apparatus shown in FIGURE 1 consists essentially of a group of component elements assembled in a case 1 having a tubular extension 2 depending from its lower portion, which is embedded or fastened in any other suitable way in the case 1; this tubular extension 2 constitutes a sleeve member in which the rod of a feeler 3 is slidably fitted without play, the lower end of the feeler 3 being adapted to engage the part or workpiece to be checked or measured, whilst the central portion of the rod is formed with an aperture (slot, mortise, or cavity) through which a measuring member 5 is mounted; this member 5 is preferably of rocker or beam configuration and engages at 6, that is, at a point providing a substantial reduction in flexure stress, the feeler rod aperture so as to act as a lever arm fulcrumed at 7 in a yoke 8 formed in the case wall material.

The slotted portion of the feeler rod 3 transmits the axial thrust of the feeler to a projection 6 forming an integral part of the beam 5 (or of the feeler, according to the design contemplated), this beam 5 carrying at either end a socket or other adequate electric contact member 10, 11 secured by by clamping, upsetting, or otherwise (see FIG. 4) which is electrically insulated from the body of the measuring element and electrically connected together with correspondingly energized circuit elements, to a suitable source of current. The yoke 8 is provided with play take-up means (see FIG. 5) disposed concentrically to the lever axis and consisting for example of a flexible washer 24 which, by enabling the face 9 of the measuring element to bear perfectly against the corresponding face of the yoke, permits a strict repetition of the electric contacts 10, 11 directed normally to their surface and in the median plane of this washer.

The measuring member 5 may be urged against the rod of the feeler member 3 by means of a spring 12, but any other suitable means may be contemplated to this end provided that it resiliently urges the lever arm 5 against the feeler rod 3. Overlying the ends of the measuring member and registering with the sockets 10, 11 are a pair of adjustment screws 13, 14 engaging a nut of insulating material 15, 16 of which the right-hand or "Maximum" screw 14 has a spring-loaded contact stud 17 urged by a spring 18 or any other suitable device adapted to prevent the lever arm from being forced by the application of an excessive pressure thereon. The fixed contact associated with the left hand or "Minimum" screw 13 is rigid because the maximum contact pressure which can be exerted thereon is derived from the calibrated spring 21, described in greater detail below.

A pair of metal clamps 19, 20 (see FIG. 3) connected to conductors transmitting the electric current to the signalling, recording or control members, are incorporated in a slot formed in the nuts 15, 16 of insulating material to ensure the electric contact while compensating any play likely to develop in the adjustment screws 13, 14 by exerting a lateral thrust thereon and holding these screws against the wall opposite to the clamp-receiving cavity. The feeler mmeber 3 is urged against the part to be measured or checked by a movable push member device comprising a calibrated spring 21 exerting a pressure equal to the required measuring or checking pressure, this device being locked in axial position in the case 1 by a suitable set screw 22 or the like. This screw may also be used for locking in position any other member, for example the shank of a dial gage indicator (FIG. 2) when the measuring apparatus is associated with an indicator of this character, to permit in a very simple manner of either adjusting or pre-setting the apparatus itself without the assistance of any other auxiliary elements of comparison, or completing the data supplied by the apparatus with the differences read on the dial of the indicator.

The apparatus is mounted firstly on a universal support and gaged relative to reference elements (for example the minimum dimensions of the object to be measured, or gaged blocks) the adjustment screw 13 being rotated one or the other way until the corresponding minimum circuit is established and lights either a telltale lamp incorporated in the case of the apparatus or a light signal disposed an a separate casing, or operates any other suitable signalling, recording or control system.

If the apparatus is equipped with a dial gage indicator as the feeler members of both apparatus are connected to each other, their displacements are identical. In this case the calibrating operation may be effected without resorting to reference elements by using a part having exactly known dimensions. The scale value corresponding to the measurement of this part is marked or identified on the dial of the gage indicator and the difference between the dimension of the part and the maximum dimension is added to the value thus set, and the adjustment screw 13 (minimum) is then operated to move the lever arm 5 together with the feeler of the dial gage indicator to move the pointer thereof until it attains the scale line corresponding to the desired maximum dimensions. The corresponding maximum contact is established thereafter by actuating the screw 14 until the circuit is closed (the maximum tell-tale lamp being lighted at this time) so that the maximum dimension is identified. In the same way the minimum dimensions is adjusted, but this is done by subtracting from the reading the difference between the dimension of the reference part and the minimum dimension by turning the screw 13 in the unscrewing direction until the pointer of the gage dial indicator reaches the scale line correspoding to the minimum dimension. Thus, the extreme allowable limits for the parts to be checked are clearly defined.

When a part having a dimension equal to or lower than the minimum dimension is tested, the rod of the feeler member 3 which is urged by the spring 21 engages the measuring element 5 held in contact with the rod of the feeler member 23 by the spring 12. The left-hand end of the measuring element 5 engages the head of the adjustment screw 13 through the medium of its contact socket 10, and the electrical circuit is established, so that the minimum tell-tale lamp is lighted or any other signalling, recording or control means is operated.

If the part has dimensions within the preset tolerances the lever 5 is raised by the feeler member 3 and opens the minimum circuit. On the other hand, if the dimension of the part is equal to or greater than the maximum dimension, the rod of the feeler member 3 will continue its axial thrust and carry along the measuring element 5 upwards until the socket 11 engages the collapsible contact stud 17 of screw 14 to establish the corresponding maximum circuit.

If a dial gage indicator the feeler rod of which is substituted for the spring-loaded device 21 is associated with the device the dimensions and differences may be read directly on the dial of the auxiliary instrument and also from the tell-tale lamps of the electric signalling means that may be provided in these apparatus for comparison measurements, in view of quickly drawing the operator's attention on the parts which are not within the requisite tolerances. Thus, the left-hand lamp indicates the minimum dimensions, and the right-hand one the maximum dimensions.

The technical advantages resulting in the construction of measuring apparatus from the arrangement described hereinabove lie on the following features:

A great simplicity of fabrication resulting from the use of parts of extremely simplified forms, easy to manufacture, without requiring very accurate machining steps, since these parts may even be mass-produced by stamping, punching or screw-cutting at a very low cost;

A rational contact arrangement whereby these contacts operate normally to their contact faces to keep undue friction and wear to a minimum while ensuring a faultness, reliable repetition of the connections.

The combination of these different means will give to the apparatus in which they are incorporated the qualities required for obtaining a very high degree of precision, of the order of ±0.00025 millimeter with a wide range of applications resulting from a high fidelity excluding any uncertain zones since it is even possible to spread the tolerance of fabrication, an increased sensitivity exceeding that of dial gage indicators, a high efficiency due to the rapidity with which the measurements are made, and the possibility of making substantial savings due to the low cost of the means employed.

Figure 8:
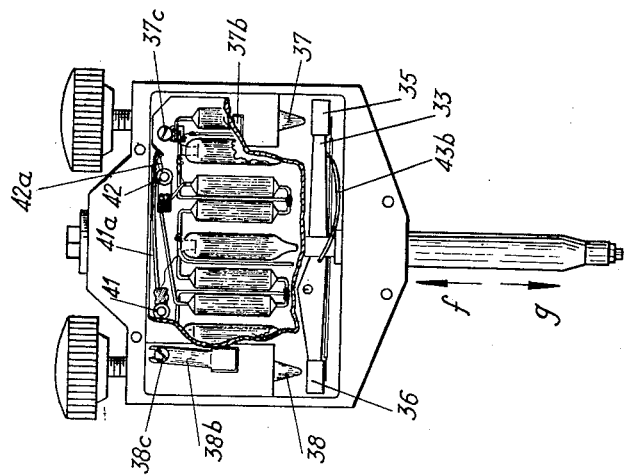
FIGURE 8 is an elevational view showing the apparatus of FIGURE 6 with the case cover removed to show the interior thereof.
Figure 6:
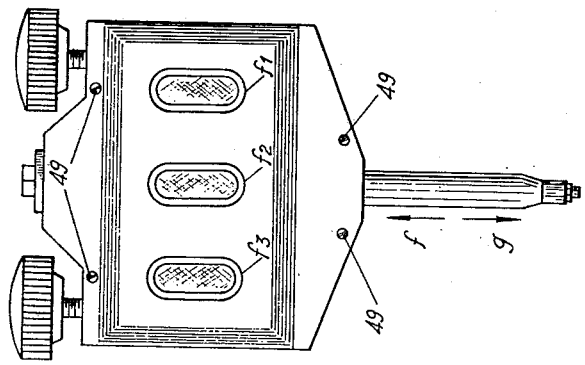
FIGURE 6 illustrates in elevational view a checking and measuring apparatus comprising a signalling device according to this invention.
Figure 10:
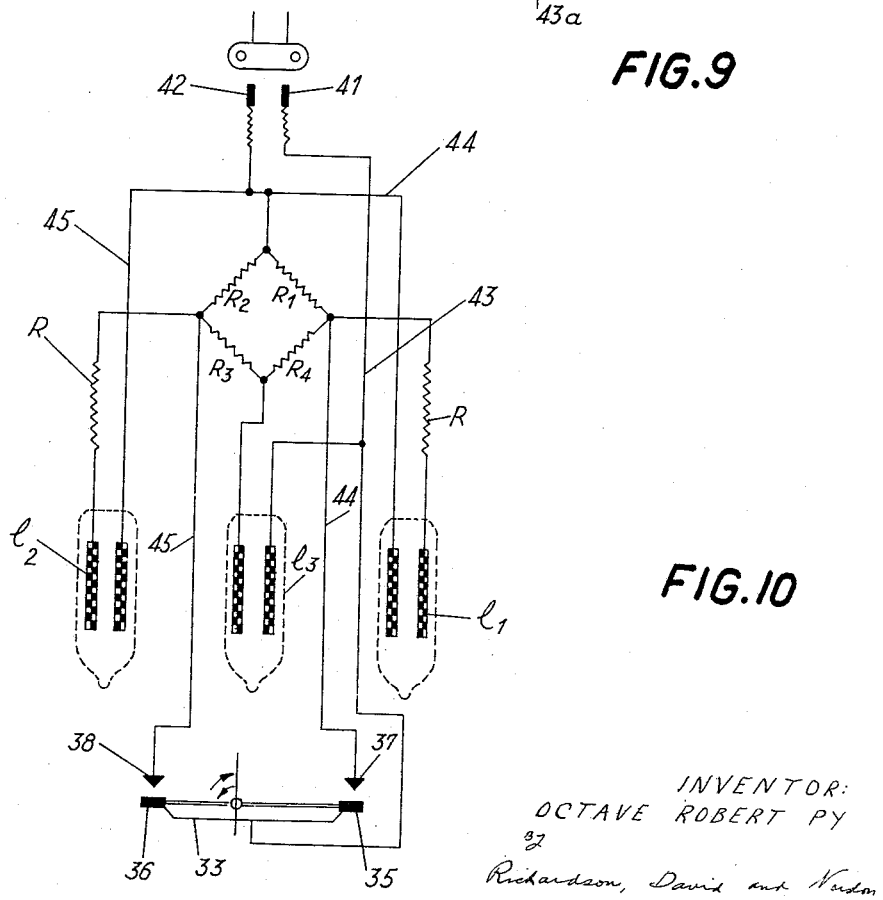
FIGURE 10 is a wiring diagram of the electric signalling device of FIG. 9.

According to the modified embodiment shown in FIGS. 6 to 8 of the drawings there is associated to the apparatus described hereinabove a signalling device the electric wiring diagram of which is illustrated in FIG. 10. This circuit is established as follows:

A feed voltage for example from the mains or power lines is applied across the input and output terminals 41, 42 of the circuit. The input terminal 41 is connected through the conductor 43 to the beam 33 and from the latter to the two movable contacts 35, 36 carried by the end sockets of this beam. The fixed contacts 37, 38 are connected on the other hand to the other terminal 42 of the circuit through resistors R connected in series with two indicating lamps $l_1$, $l_2$, the circuit corresponding to each fixed contact being designated by the relevant conductors 44, 45, respectively. These conductors 44, 45 are connected to a common wire 46 leading in turn to the output terminal 42.

A third indicating lamp $l_3$ is connected across power supply conductors 43 and 44 in series with a bridge type network consisting of four equal resistors $R_1$, $R_2$, $R_3$ and $R_4$. The lamps $l_1$, $l_2$ and $l_3$ are neon glow lamps adapted for operation at full line voltage.

When fixed contacts 37 and 38 are both open, the effective resistance in series with lamp $l_3$ is equal to the resistance of any one of the equal resistors $R_1$ to $R_4$ and lamp $l_3$ is lighted indicating that the specimen being gauged is within the predetermined limits of dimensional tolerance. The voltage drop across resistor $R_1$ is insufficient to light lamp $l_2$ and the voltage drop across resistor $R_2$ is insufficient to light lamp $l_2$.

When contacts 36 and 38 close because the specimen is outside of limits in one direction, the series combination of lamp $l_2$ and resistor R is connected directly to a circuit energized with full line voltage. The series combination of resistors $R_1$, $R_4$ and $R_3$ is simultaneously subjected to full line voltage with the lamp $l_3$ connected across resistor $R_3$. The voltage across $R_3$ under these conditions is only one third of full line voltage so that the lamp $l_3$ is extinguished and the voltage drop across $R_1$ is only one third of full line voltage so that the lamp $l_1$ remains extinguished. Full line voltage is applied to resistor $R_2$ which is designed to withstand such energization. Similarly, when contacts 35 and 37 close because the specimen is outside of limits in the other direction, lamp $l_3$ will be extinguished and lamp $l_1$ will light, the lamp $l_2$ remaining extinguished.

Thus, it will be seen that with this mounting the signalling device indicates in a simple manner through the lamps $l_1$ and $l_2$ the limit positions or maximum and minimum positions of the feeler member during the checking operation and also, through the lamp $l_3$, the aggregate intermediate positions which the feeler member may assume.

Figures 3, 4, 5:
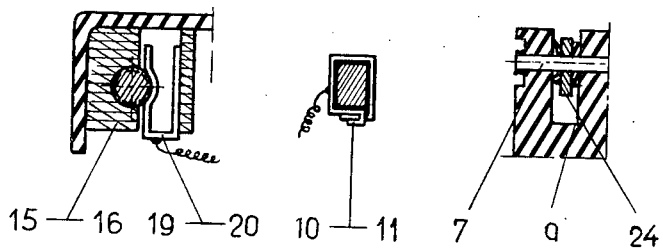
FIGURE 3 is a diagrammatic section showing the nut with its play take-up arrangement and electrical connection.
FIGURE 4 is a cross-section showing a lever-tip socket.
FIGURE 5 shows the position of the flexible washer in the yoke.

In the practice this signalling device is constructed preferably by arranging all its component elements on a plate or like support 45 (see FIG. 9) for example of impregnated cardboard or other suitable insulating material. FIGURE 4 designates all the component elements of this circuit with the same reference numerals. The connecting wires, resistors and neon or like glowlamps of the device are connected with one another and secured on the plate 45 by welding, setting, crimping or any other simple assembling methods. Preferably, eyelets e or like members are set on the plate 45 for electrically connecting this signalling device to the checking or measuring apparatus on the one hand and to the mains terminals, on the other hand, these eyelets or the like being most convenient for simultaneously securing the plate 45 on the case of the apparatus.

In the embodiment illustrated (see FIG. 8) the plate 45 is dimensioned to fit in the case of the apparatus and may be secured therein for example by means of a pair of screws 37c, 38c passing through the eyelets 37a, 38a and engaging suitable insulating portions of the case. Thus, these screws provide at the same time an electrical connection between the points 37a and 38a, on the one hand, and the fixed contacts 37 and 38, on the other hand, through contact lugs or tags 37b, 38b connected electrically inside the apparatus with the fixed contacts 37, 38.

On the other hand the eyelets 41a and 42a are electrically connected to a pair of mains conductors 41b, 42b issuing from a feed cord 47. Finally the wire 43 of the signalling circuit is electrically connected through an eyelet or like member 43a and a wire 43b to the beam 33.

Figure 9:
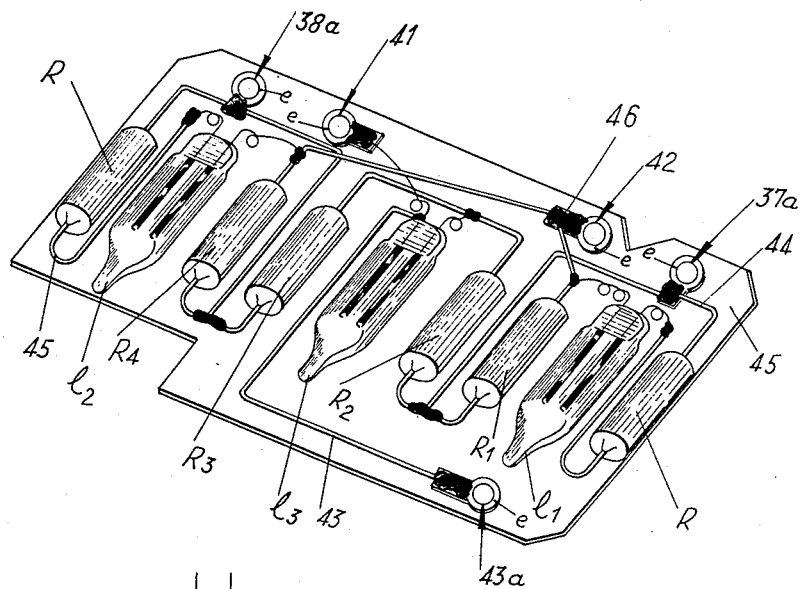
FIGURE 9 is a perspective view of a signalling device constructed according to the teachings of this invention.

The plate 45 with the different component elements of the signalling circuit thereon is mounted separately so as to constitute a self-contained unit as shown in FIG. 9. This unit is thus readily fitted and secured in the case and subsequently covered by a cover-forming wall element 48 of the case which is secured by screws 49 or the like.

Figure 7:
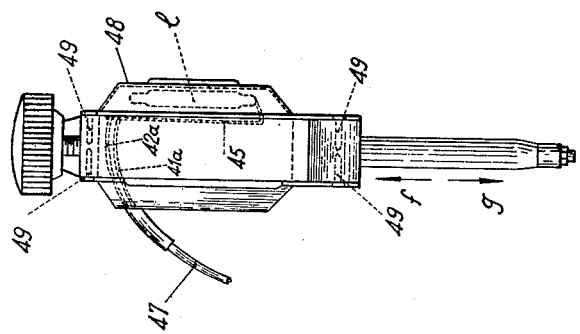
FIGURE 7 is a side view of the apparatus of FIG. 6.

This wall element 48 may be hollow as shown in FIG. 7 to constitute a convenient housing for the tube-lamps and the resistors of the signalling circuit; in this case apertures or ports $f_1$, $f_2$, $f_3$ are provided in the element 48 which register with the lamps $l_1$, $l_2$, $l_3$ so that these may be observed directly from the outside when they are lighted up.

Of course, it is also possible to provide electric signalling circuits having a wiring diagram differing from the one described and illustrated herein, to use any other and suitable number of indicating lamps or the like, to alter the shape of the plate 45 and case, etc., without departing from the spirit and scope of the invention as set forth in the appended claims.

Moreover, if desired the plate 45 may carry only the wiring diagram of the device which is connected to indicating lamps, bell rings, or the like disposed externally of the apparatus, without departing from the scope of the invention.

What I claim is:

1. Apparatus for accurately measuring or checking dimensions or like physical magnitudes comprising a casing, a feeler slidably mounted in said casing and adapted to reciprocate therein when checking said magnitudes, a substantially horizontal beam means carrying at each end a movable electric contact, said beam means being pivotally mounted in said casing at a fixed point located between said contacts, said beam means being actuated by said feeler at a point of application located between said contacts and close to said fixed point, fixed contacts of an electrical signalling circuit registering with said movable contacts and cooperating therewith for closing said circuit by either of said movable contacts contacting the relevant fixed contact when the oscillating movement of said beam means caused by the sliding movement of said feeler attains a predetermined amplitude, said fixed contacts consisting of rod means slidably and resiliently mounted in adjustable cylindrical sockets screwed in insulating portions of the casing, said insulating portions of the casing having a recess in which a spring clamp is so housed as to bear resiliently against the surface of the relevant socket for taking up any play likely to develop between said socket and said insulating portions, said sockets and said clamps connecting electrically the relevant rod means to said signalling circuit.

2. Apparatus for accurately measuring or checking dimensions or the like physical magnitudes comprising a casing, a feeler slidably mounted in said casing and adapted to reciprocate therein when checking said magnitudes, a substantially horizontal beam means carrying at each end a movable electric contact with an upwardly located contacting surface, said beam means being pivotally mounted in said casing at a fixed point located between said contacts, said beam means being actuated by said feeler at a point of application located between said contacts and close to said fixed point, fixed contacts of an electrical signalling circuit registering with and located above said movable contacts for cooperating therewith and closing said circuit by either of said movable contacts contacting the relevant fixed contact when the oscillating movement of said beam means caused by the sliding movement of said feeler attains a predetermined amplitude, said fixed point and said point of application being substantially aligned with the contacting surfaces of said movable contacts, said fixed contacts consisting of rod means slidably and resiliently mounted in adjustable cylindrical sockets screwed in insulating portions of the casing comprising a recess with inner springs means cooperating with the relevant socket for taking up any play likely to develop between said socket and said insulating portions, said sockets connecting electrically the relevant rod means to said signalling circuit.

3. Apparatus for accurately measuring or checking dimensions or like physical magnitudes comprising a casing, a feeler slidably mounted in said casing and adapted to reciprocate therein when checking said magnitudes, a substantially horizontal beam means carrying at each end a movable electric contact with an upwardly located contacting surface, said beam means being pivotally mounted in said casing at a fixed point located between said contacts, said beam means being actuated by said feeler at a point of application located between said contacts close to said fixed point, fixed contacts of an electrical signalling circuit registering with and located above said movable contacts for cooperating therewith and closing said circuit by either of said movable contacts contacting the relevant fixed contact when the oscillating movement of said beam means caused by the sliding movement of said feeler attains a predetermined amplitude, said fixed point and said point of application being substantially aligned with the connecting surfaces of said movable contacts, said fixed contacts consisting of rod means slidably and resiliently mounted in adjustable sockets located in said casing, resilient means being provided in said casing for holding said sockets without play while connecting electrically the relevant rod means to said signalling circuit.

4. Apparatus for accurately measuring or checking dimensions or like physical magnitudes comprising a casing, a feeler slidably mounted in said casing and adapted to reciprocate therein when checking said magnitudes, a substantially horizontal beam member carrying at each end a movable electric contact with an upwardly facing contacting surface, said beam member being pivotally mounted in said casing at a fixed point located between said contacts, said beam member being actuated by said feeler at a point of application located between said contacts and close to said fixed point, fixed contacts registering with and located above said movable contacts for selective engagement by one or the other of said movable contacts when the pivotal movement of said beam member caused by the sliding movement of said feeler attains a predetermined amplitude, an elongated exteriorly threaded electrically conductive supporting member for each fixed contact, an interiorly threaded electrically insulative supporting member for each of said exteriorly threaded supporting members, said interiorly threaded supporting members being fixedly positioned with respect to said casing, the position of each fixed contact being individually adjustable with respect to said beam member by rotation of its exteriorly threaded supporting member, and a separate resilient electrically conductive terminal member yieldingly laterally engaging each of said exteriorly threaded supporting member, said terminal members simultaneously reducing play between said supporting members and providing circuit connections to said fixed contacts.

5. An indicating circuit comprising three gaseous discharge lamps, an energizing circuit for said lamps comprising first and second power supply conductors, two fixed contacts, a movable contact member selectively engageable with either one of said fixed contacts with break-before-make sequence, a four-terminal network of four equal resistors connected in a balanced bridge arrangement, one terminal of said network being connected directly to said first conductor, a first one of said lamps being connected between the terminal of said network opposite said one terminal and said second conductor, said second conductor being connected directly to said movable contact member, a second one of said lamps being connected across said one terminal and one of the terminals adjacent thereto, one of said fixed contacts being connected to said last-named terminal, the third one of said lamps being connected across said one terminal and the other terminal adjacent thereto, the other one of said fixed contacts being connected to said last-named terminal, a single one of said three lamps being lighted in any position of said movable contact member including a position of disengagement from both fixed contacts.

References Cited in the file of this patent

UNITED STATES PATENTS

| | | |
|---|---|---|
| 928,174 | Bodmer | July 13, 1909 |
| 1,952,171 | Jones | Mar. 27, 1934 |
| 2,043,000 | Ketay | June 2, 1936 |
| 2,077,123 | Mahr | Apr. 13, 1937 |
| 2,118,483 | Woodman | May 24, 1938 |
| 2,305,380 | Edwards | Dec. 15, 1942 |
| 2,433,585 | Warner | Dec. 30, 1947 |
| 2,610,519 | Rokos | Sept. 16, 1952 |
| 2,616,994 | Luhn | Nov. 4, 1952 |
| 2,667,631 | Schaurte | Jan. 26, 1954 |
| 2,677,125 | Pistoles | Apr. 27, 1954 |
| 2,793,441 | Frenk | May 28, 1957 |

FOREIGN PATENTS

| | | |
|---|---|---|
| 936,443 | France | Feb. 16, 1948 |